Figure 1:
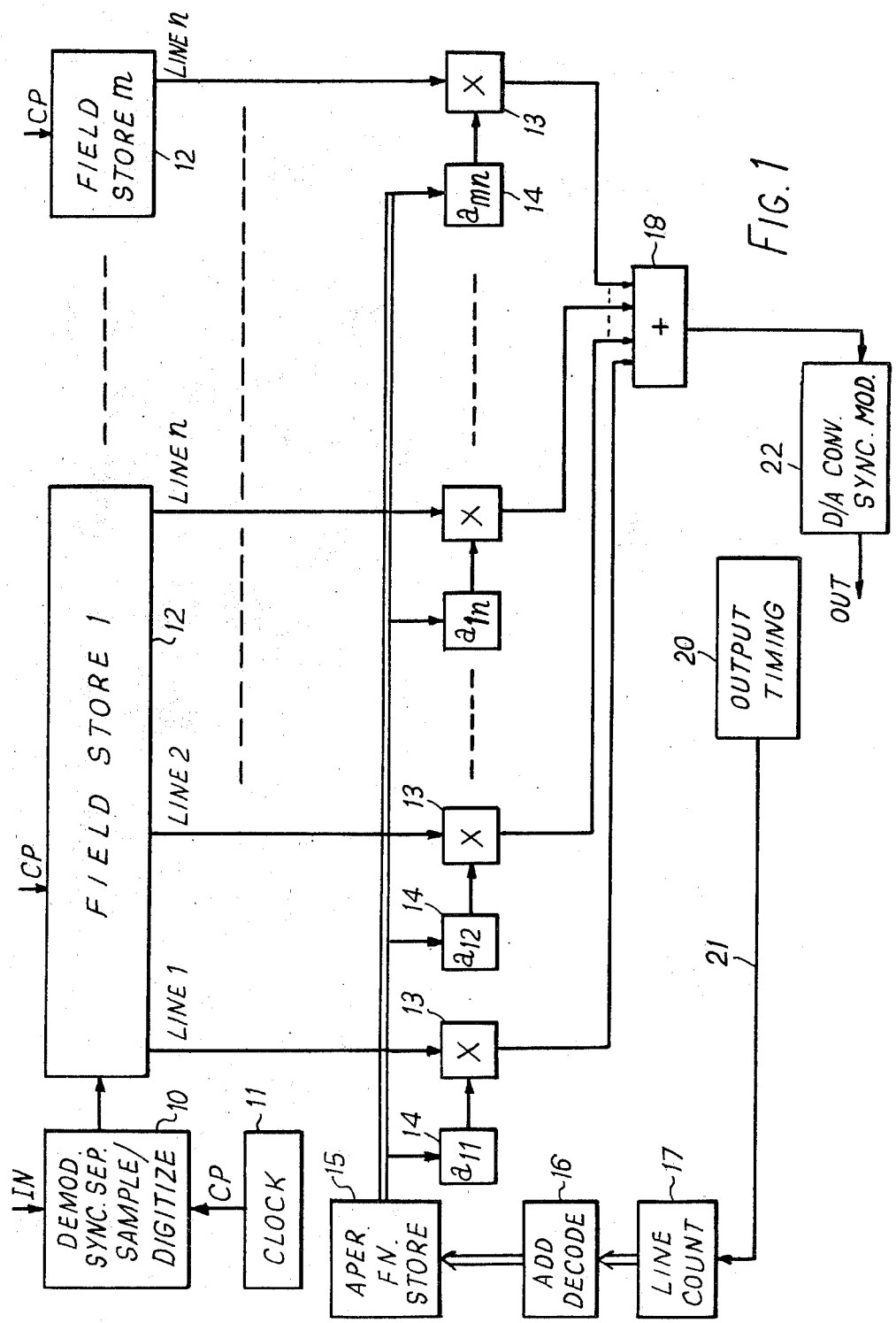

United States Patent [19]

Clarke

[11] 4,335,395
[45] Jun. 15, 1982

[54] STANDARDS CONVERSION OF COLOR TELEVISION SIGNALS

[75] Inventor: Christopher K. P. Clarke, Crawley, England

[73] Assignee: British Broadcasting Corporation, London, England

[21] Appl. No.: 185,068

[22] Filed: Sep. 8, 1980

[30] Foreign Application Priority Data

Oct. 5, 1979 [GB] United Kingdom ............... 7934695

[51] Int. Cl.³ .............................................. H04N 9/42
[52] U.S. Cl. ..................................................... 358/11
[58] Field of Search ......................................... 358/11

[56] References Cited

U.S. PATENT DOCUMENTS 4,106,053  8/1978  Maxemchuk ......................... 358/11
4,240,101  12/1980  Michael et al. ...................... 358/11

Primary Examiner—Richard Murray
Attorney, Agent, or Firm—Robert F. O'Connell

[57] ABSTRACT

Demodulated luminance (Y) and chrominance (U, V) signals are stored in field stores 1 to m each with line outputs 1 to n. Output lines are formed by summing the producs of the line outputs with weighting coefficients which are specified for each line in the output standards. Separate sets of coefficients for luminance and chrominance are stored in respective memories. The chrominance sets are arranged to reduce the vertical and temporal resolution of the chrominance information. This has the beneficial effect of reducing cross-color interference. In the implementation shown the signals are stored as time multiplexed digital samples YYYUV (i.e. with one pair of chrominance samples to three luminance samples) and the luminance and chrominance coefficient sets for the current output line are stored as $a_{11}$ to $a_{mn}$ and $b_{11}$ to $b_{mn}$ respectively in buffer registers. A switching waveform controls electronic switches to apply $a_{11}$ to $a_{mn}$ to multipliers when Y samples are presented and to apply $b_{11}$ to $b_{mn}$ when U or V samples are presented.

4 Claims, 13 Drawing Figures

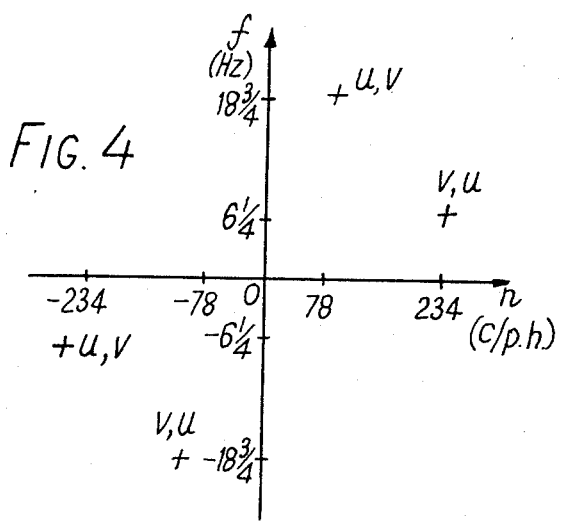
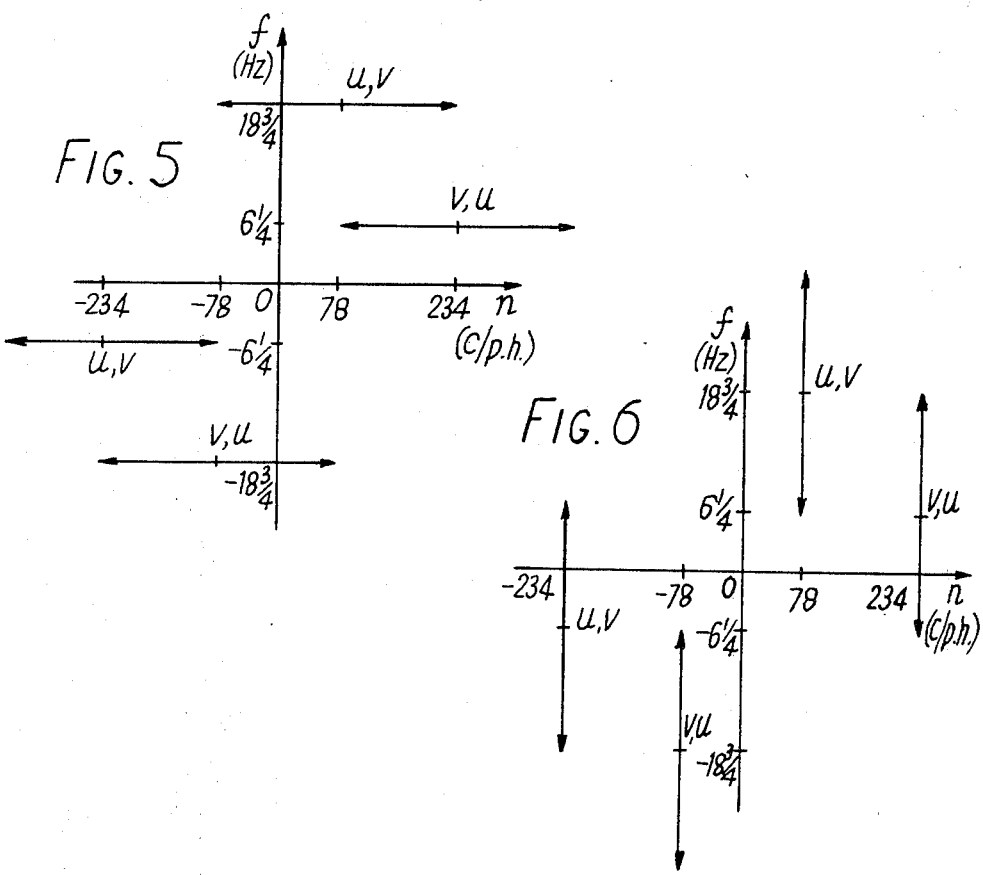

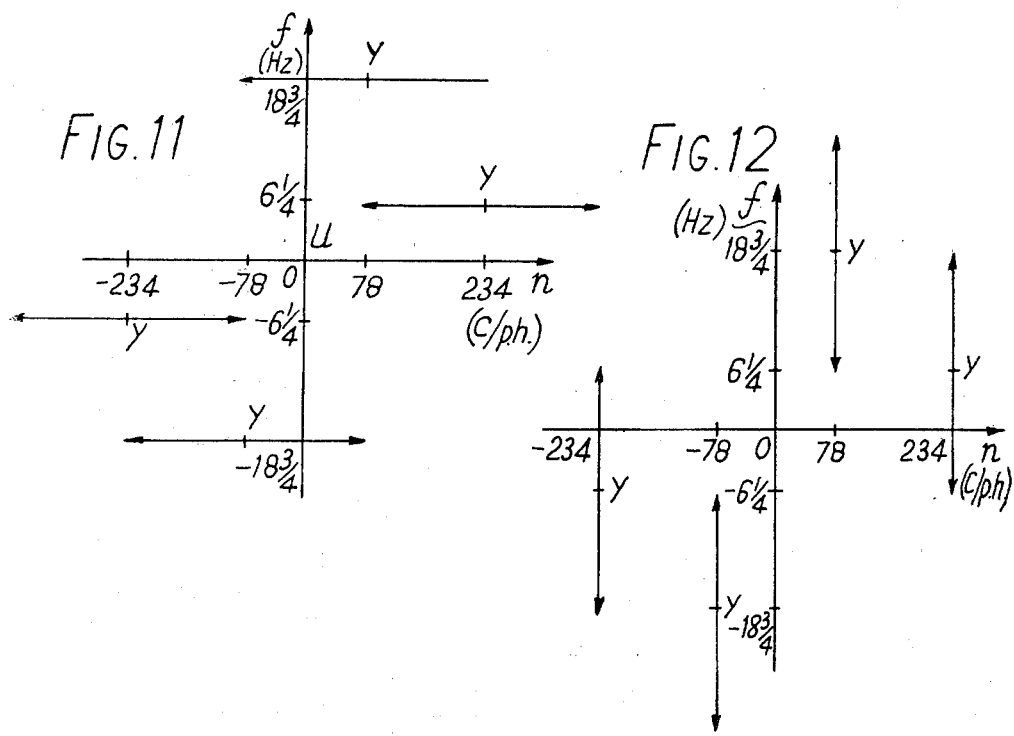
FIG.11
FIG.12
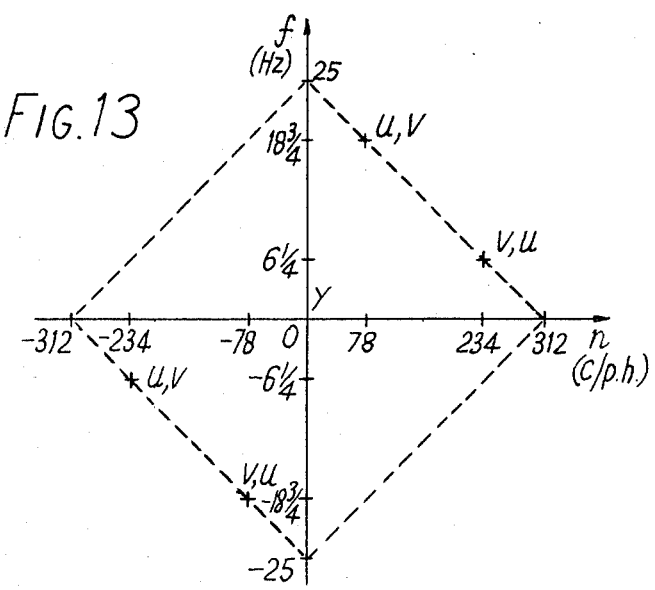
FIG.13

STANDARDS CONVERSION OF COLOR TELEVISION SIGNALS

The present invention relates to standards conversion of colour television signals between standards using different numbers of lines per field, e.g. between NTSC 525/60 signals and PAL 625/50 signals. The principles of standards conversion by interpolation and line duration adjustment are well known. The present invention is not concerned at all with the latter adjustment which involves time compression or expansion of individual lines to take account of the difference between the line periods of the two standards (a very small difference in the example quoted above) and also to deal with timing errors which arise during the interpolation.

Interpolation involves creating output lines by selecting input lines or weighted combinations thereof where the input lines from which selection is made comprise signals with various combinations of field and half-line delays (for an interlaced system; one-line delays for a non-interlaced system).

When an output line coincides with an input line, when the rasters are superimposed, the output line could be formed by selecting solely that input line. When an output line is exactly half-way between two lines it could be formed by selecting the average of those input lines (separated by one field period plus or minus half a line period for an interlaced system), and so on. Fuller discussion of this topic can be found in "Field Store Standards Conversion", W. Wharton and R. E. Davis, Proc. IEE, Vol. 113, No. 6, June 1966, pp 986–996 and in British Pat. No. 1,191,500.

This approach can be generalised in the manner explained more fully below with reference to FIG. 1 of the drawings, to making every output line the sum of a plurality of products each consisting of a stored line multiplied by a weighting coefficient. The set of weighting coefficients is specified individually for each output line and is determined according to the relative phasing of each output line relative to the input lines, in both time and position. The function which relates phasing to weighting coefficients is known as an interpolation aperture function. The aperture function determines the conversion performance.

It should be noted that the lines may be stored in analogue form in a delay line type of store or as digital samples in a digital store.

When a colour television signal is to be converted it is necessary to demodulate and handle the luminance and chrominance information separately in order that the chrominance information may, after conversion, be remodulated in accordance with the colour subcarrier specification for the standard to which conversion has been effected. Although this procedure is basically satisfactory, it is found both in practice and by theoretical analysis, that the converted signal decoded at a receiver is subject to chrominance noise and cross-colour interference. The object of the present invention is to provide improved apparatus which reduces these undesired effects.

According to the present invention, there is provided apparatus for conversion of colour television signals between standards using different numbers of lines per field and fields per second, comprising first storage means storing separately luminance and chrominance information pertaining to a plurality of lines of a plurality of fields of an input signal, second storage means storing in respect of each line of an output signal a set of luminance weighting coefficients and a set of chrominance weighting coefficients providing separate interpolation aperture functions for luminance and chrominance information, and means arranged to form luminance and chrominance signals on an output line-by-line basis by summing the products of the coefficients of the respective sets and the stored information to which the coefficients apply.

Preferably the interpolation aperture function for chrominance information is such as to effect a reduction in resolution of the chrominance information of the picture provided by the output signal.

The reduction in resolution may be in both the vertical spatial domain and in the time domain although some benefit can be obtained by a reduction in resolution in either one domain only. The reduction of chrominance resolution need produce little if any reduction in the apparent sharpness of pictures but is very beneficial in reducing cross-colour interference. For stationary pictures, cross-luminance and cross-colour signals are well separated from true luminance and chrominance signals in the vertical/temporal frequency plane. The normal lowpass filtering action of the interpolation process has a beneficial effect, significantly reducing some forms of cross-luminance and cross-colour. A further reduction of cross-colour is obtained by reducing the vertical and temporal resolution of the interpolation function for the colour information.

In the ensuing more detailed description of the invention, various assumptions will be made regarding features which are neither individually nor collectively essential to the performance of the invention. Such features are:

(1) The signals are in the form of digital samples.
(2) The chrominance information are handled in the form of the two colour difference signals U and V.
(3) Luminance and chrominance information are handled in time division multiplex.

Figure 2:
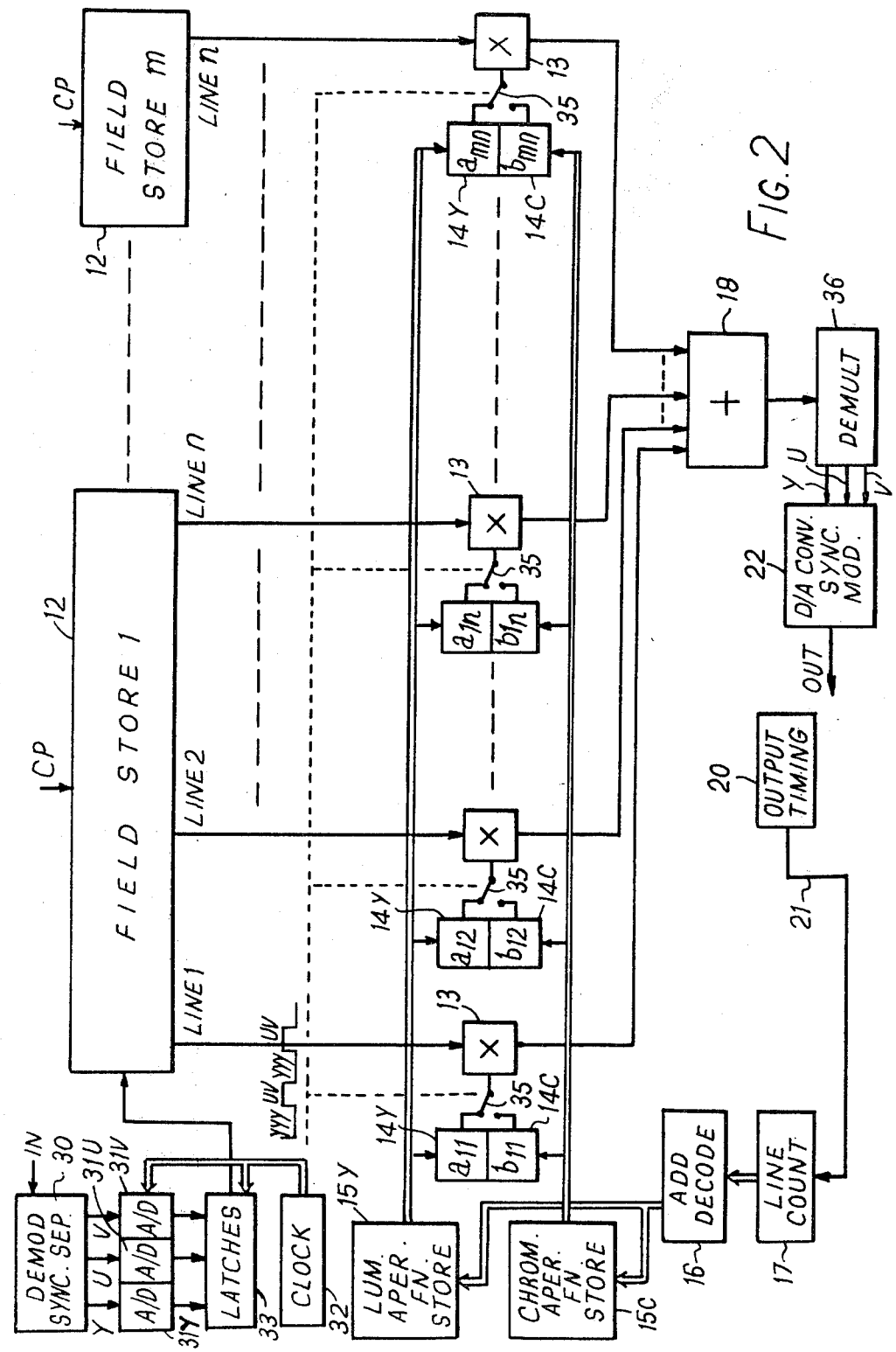
Figure 3:
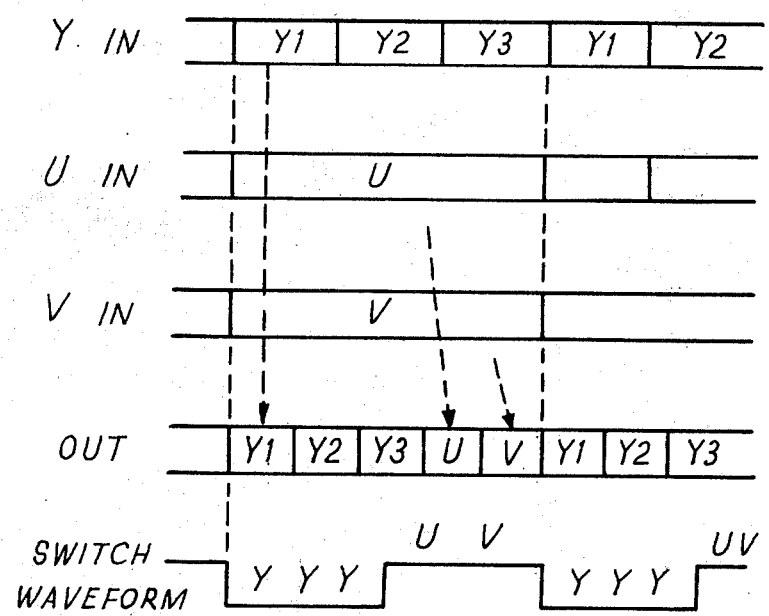

The invention will be described in more detail, by way of example, with reference to the accompanying drawings, in which:

FIG. 1 is a block diagram illustrating the generalized principle of conversion by interpolation, FIG. 2 is a block diagram of an embodiment of the invention, and FIGS. 3 to 13 are explanatory diagrams.

Referring to FIG. 1, in a known standards converter, an incoming monochrome television signal is processed conventionally in block 10 to demodulate the video, separate the sync pulses and sample and digitize the raw video at a rate determined by sample clock pulses CP from a clock 11. The samples are written into m field stores 12 which may be word-serial, bit-parallel shift register type devices or equivalent RAM devices with cyclic addressing arrangements. Assuming that there are n lines per field, each store 12 has line outputs 1 to n. These outputs are connected to respective multipliers 13 supplied with respective weighting coefficients $a_{11}$ to $a_{mn}$ where the first and second subscripts identify the store number and the line number.

The set of coefficients is supplied to buffer registers 14 from an aperture function store 15, a fresh set for each output line. The coefficients stay unchanged during each output line. Although there is an infinite set of line and field phases, the line and field phase of the aperture function held in store 15 is quantised to reduce the number of sets of coefficients to manageable proportions. Some lines will require the same coefficients and it can be arranged to address the correct set for each output line from a line counter 16 and address decoder 17. Field phase information for coefficient selection is obtained by subtracting the input and output standard line numbers. Each set of coefficients will sum to unity. The individual coefficients may be positive or negative and take a wide range of values, although those near the centre of the aperture tend to be larger than those at the edges.

The products from all multipliers 13 are added by a circuit 18 symbolically represented as an adder. In practice mn-1 N-bit adders in either a ladder or tree arrangement can be employed to accumulate the total sum which represents one sample for the output line. Output information is correctly timed by calling the input lines from the stores for interpolation at an appropriate time. This is possible because of read/write independence in RAM-organised field stores. The output lines are finally conventionally processed in a circuit 22 effecting digital-to-analogue conversion, insertion of sync pulses and modulation on to the RF carrier.

In the embodiment of the invention shown in FIG. 2 the incoming colour television signal is fed to a demodulator and sync separator circuit 30 which provides Y, U and V signals to respective sampling analogue-to-digital converters 31Y, 31U and 31V. The converter 31Y is run at sample rate from a clock 32. The converters 31U and 31V are run at one third sample rate so that one pair of colour difference samples is taken for three luminance samples. The samples are buffered in a set of latches 33 and read out under the control of pulses at 5/3 times the sample rate. Accordingly, luminance samples Y1, Y2, Y3 and chrominance samples U and V are time multiplexed in the manner indicated in FIG. 3. The clock 32 also provides a corresponding switching waveform YYYUV as shown. Other multiplex switching sequences could be used equally well.

The apparatus of FIG. 2 comprises field stores 12, multipliers 13, and an adding arrangement 18 as in FIG. 1. However the aperture function store 15 and buffer registers 14 are replaced by separate stores 15Y and 15C for luminance and chrominance aperture functions represented by weighting coefficient sets $a_{ll}$ to $a_{mn}$ for luminance and $b_{ll}$ and $b_{nm}$ for chrominance and corresponding buffer registers 14Y and 14C. Each pair of registers 14Y and 14C is connected to its multiplier 13 by a switch 35 shown symbolically as an electromechanical switch; in practice an FET switch or other electronic switch will be employed. The switches 35 are all controlled by the switching waveform YYYUV so that, when luminance samples are fed to the multipliers 13, the weighting coefficients $a_{ll}$ to $a_{mn}$ are employed and when chrominance samples are fed to the multipliers 13, the weighting coefficients $b_{ll}$ to $b_{mn}$ are employed.

Once again the coefficients stay the same throughout each output line and both stores 15Y and 15C are addressed in the same manner as the store 15 of FIG. 1. The output lines are handled much as in FIG. 1 although a demultiplexer 36 is required to sort and re-time the Y, U and V samples into separate channels before digital to analogue conversion and remodulation are effected.

Detailed analysis of the conversion operation, e.g. for NTSC to PAL conversion, can be effected by considering effects in the vertical/temporal frequency plane where f is the temporal frequency in Hertz and n is the vertical frequency in cycles per picture height, (c/ph).

When projected on to the n-f plane, the subcarrier positions are as shown in FIG. 4. Here, both subcarriers are present at each position, because the U and V positions are interchanged for positive and negative values of m; the positions for positive m are written first, m being horizontal frequency.

The effect of chrominance modulation is shown in FIGS. 5 and 6. When the subcarriers are modulated by vertical frequencies, sidebands extend from the subcarrier positions along lines parallel to the n axis as shown in FIG. 5. For temporal modulation, which might be produced by a moving coloured object, the sidebands extend parallel to the f axis (FIG. 6). The modulation is not bandlimited in either case, but aliasing will occur for vertical modulating frequencies exceeding $312\frac{1}{2}$ cycles per picture height (c/p.h) or for temporal modulating frequencies exceeding 25 Hz.

Figure 7:
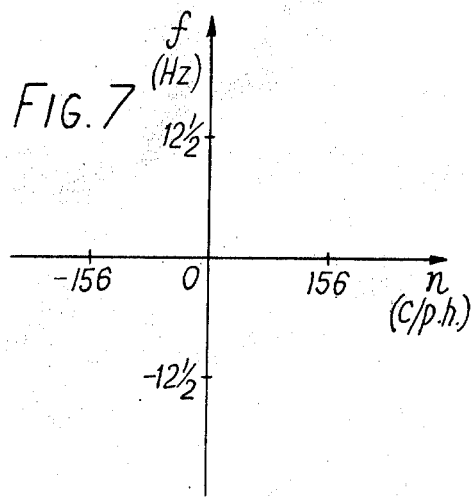
Figure 8:
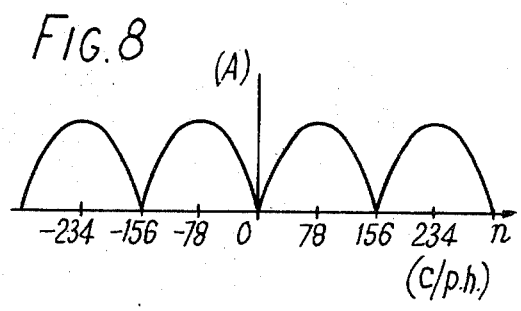

Besides cross-luminance, some decoders (those incorporating PAL modifiers or equivalent operations) introduce luminance aliasing centred on twice subcarrier frequency. In the n-f plane, the positions nearest to the origin for twice subcarrier frequency are $(156, -12\frac{1}{2})$ and $(-156, 12\frac{1}{2})$, as shown in FIG. 7. However, the luminance aliasing has a vertical frequency characteristic such as that of FIG. 8. Therefore, the aliasing reaches a peak value at $(78, -12\frac{1}{2})$ and at $(-78, 12\frac{1}{2})$ when high vertical frequency luminance is present.

Figure 9:
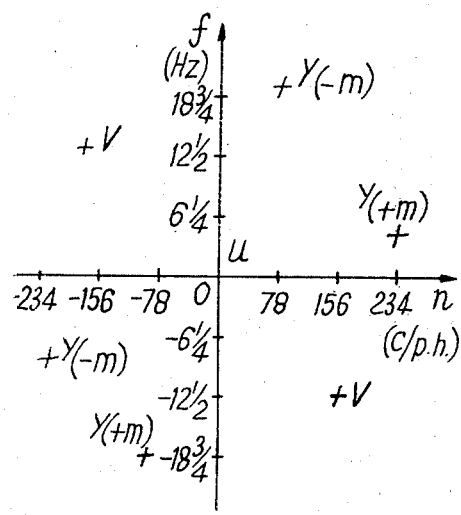
Figure 10:
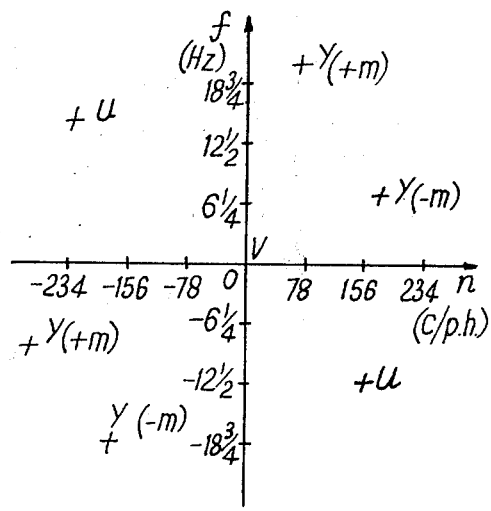

Demodulation of the U and V subcarriers moves the spectra to the positions shown in FIGS. 9 and 10 for the U and V channels respectively. The centres of the luminance spectra that cause cross-colour now occupy the positions previously occupied by the subcarriers. Purely horizontal frequency luminance, that is luminance with n and f equal to zero, produce two types of cross-colour: one is fast-moving ($18\frac{3}{4}$ Hz) with a relatively coarse vertical frequency (78 c/p.h) and the other is slow-moving ($6\frac{1}{4}$ Hz) with a fine vertical pattern (234 c/p.h).

When the luminance signal contains vertical frequency components, these appear as sidebands extending along lines parallel to the n axis, as shown in FIG. 11. For moving objects, luminance sidebands are produced along lines parallel to the f axis (FIG. 12).

FIGS. 9 and 10 each also shows the position of the other subcarrier. Because of the quadrature phase relationship between the subcarriers, under normal circumstances there is no crosstalk between the chrominance signals. However, signal distortion can produce spectral energy at these points and this appears in pictures as Hanover bars. Furthermore, some decoders (those with asymmetry) about subcarrier frequency in the vertical filter characteristic) introduce U-V crosstalk centered on these points. As with luminance aliasing, the crosstalk has a vertical frequency characteristic such as that of FIG. 8 and the peak value of crosstalk occurs at $(\pm 78, \pm 12\frac{1}{2})$ in the n-f plane.

The interpolator has the effect of a lowpass filter working in the n-f plane of the input standard. The primary purpose of this filter is to reject spectra centred on harmonics of the scanning frequencies, which otherwise would cause vertical and temporal aliasing when the signal is resampled by the output standard scanning frequencies. The alias-free limit for the 625/50 scanning standard lies on a line (presumed straight) joining $312\frac{1}{2}$ c/p.h. and 25 Hz (FIG. 13). Therefore, to obtain good conversion performance, the interpolation aperture function must provide a high level of attenuation at and beyond this line. This can be obtained with apertures of four fields by eight picture-lines.

Since the centres of cross-luminance (FIG. 4) lie on the alias-free limit (FIG. 13), the normal action of the interpolator will significantly reduce cross-luminance produced by stationary plain coloured areas. However, if there is vertical colour detail, less attenuation will result. In particular, along the 18¾ Hz line, chrominance modulation at 78 c/p.h will produce a broad flashing pattern. This will receive only moderate attenuation (typically 8.5 dB) because the reduction of response along the f axis is gradual. Also, along the 6¼ Hz line, chrominance modulation at 234 c/p.h will be unattenuated, although, in pictures, such a high frequency is statistically less likely to occur.

Similarly, the subcarrier on moving objects will be less attenuated.

The rejection of cross-luminance could be improved by using an interpolation function with reduced vertical and temporal frequency response. However, the loss of definition needed to obtain a further significant reduction of cross-luminance would probably be unacceptable.

Luminance aliasing, if present, around ($\pm 78$, $\pm 12\frac{1}{2}$) would not be significantly reduced by the interpolator.

The centres of cross-colour (FIGS. 9 and 10) also lie on the alias-free limit (FIG. 13) and will be significantly attenuated by the interpolator. With vertical frequency components in the luminance, the sidebands fall near to the f axis and produce coarse coloured patterns flashing at either 6¼ Hz or 18¾ Hz. As with crossluminance, the 6¼ Hz components will not be attenuated, whilst the 18¾ Hz components will be moderately attenuated.

U-V crosstalk, if present, around ($\pm 78$, $\pm 12\frac{1}{2}$) would not be reduced significantly.

There is more opportunity with the colour-difference channels for improving the rejection of cross-signals than there is for the luminance channel. Reduction of chrominance definition is generally less noticeable than a loss of luminance. Indeed, the vertical frequency characteristics of several PAL decoders fall to zero at 156 c/p.h. Thus, the vertical resolution can be drastically reduced to give zero response about 156 c/p.h, and the temporal response can be tailored to provide a zero at 18¾ Hz. For stationary pictures this will eliminate all but the coarse cross-colour at 6¼ Hz. Although cross-colour will tend to appear on moving objects, the amount will always be less than it would have been without filtering. A useful reduction of U-V crosstalk will also be obtained.

I claim:

1. Apparatus for conversion of colour television signals between standards using different numbers of lines per field and fields per second, comprising first storage means storing separately luminance and chrominance information pertaining to a plurality of lines of a plurality of fields of an input signal, second storage means storing in respect of each line of an output signal a set of luminance weighting coefficients and a set of chrominance weighting coefficients providing separate interpolation aperture functions for luminance and chrominance information, and means arranged to form luminance and chrominance signals on an output line-by-line basis by summing the products of the coefficients of the respective set and the stored information to which the coefficients apply.

2. Apparatus according to claim 1, wherein the interpolation aperture function for colour information is such as to effect a reduction in resolution of the chrominance information of the picture provided by the output signal.

3. Apparatus according to claim 2, wherein the luminance and chrominance information are time-multiplexed digital samples with chrominance samples interspersed among luminance samples in the first storage means and comprising a set of multipliers for multiplying a set of samples from the first storage means by a set of weighting coefficients, two sets of buffer registers for the current sets of luminance and chrominance weighting coefficients respectively, and switching means operating in sympathy with the multiplexing arrangement of the samples to select which set of buffer registers applies weighting coefficients to the multipliers.

4. Apparatus according to claim 1, wherein the luminance and chrominance information are time-multiplexed digital samples with chrominance samples interspersed among luminance samples in the first storage means and comprising a set of multipliers for multiplying a set of samples from the first storage means by a set of weighting coefficients, two sets of buffer registers for the current sets of luminance and chrominance weighting coefficients respectively, and switching means operating in sympathy with the multiplexing arrangement of the samples to select which set of buffer registers applies weighting coefficients to the multipliers.

* * * * *